United States Patent [19]

Vogel

[11] 4,293,450

[45] Oct. 6, 1981

[54] PROCESS FOR CONDUCTING ELECTRICITY UTILIZING A SPECIFICALLY DEFINED GRAPHITE INTERCALATION COMPOUND

[76] Inventor: F. Lincoln Vogel, R.D. 3, Voorhees Rd., Whitehouse Station, N.J. 08889

[21] Appl. No.: 897,443

[22] Filed: Apr. 18, 1978

[51] Int. Cl.³ .............................................. H01B 1/04
[52] U.S. Cl. ................................... 252/503; 252/506; 252/507; 252/433; 252/436; 75/229; 75/243
[58] Field of Search ............... 252/503, 506, 507, 433, 252/436; 75/229, 243

[56] References Cited

U.S. PATENT DOCUMENTS

| | | | |
|---|---|---|---|
| 3,409,563 | 11/1968 | Olstowski | 252/506 |
| 3,765,881 | 10/1973 | Scholpp | 252/503 X |
| 3,962,133 | 6/1976 | Rodewald | 252/433 |
| 3,984,352 | 10/1976 | Rodewald | 252/436 |
| 4,072,516 | 2/1978 | Pepper et al. | 252/503 X |

*Primary Examiner*—Brooks H. Hunt
*Assistant Examiner*—J. L. Barr
*Attorney, Agent, or Firm*—Kenneth A. Genoni

[57] ABSTRACT

An electrically conductive composition is provided which comprises an intercalation compound of (1) graphite, (2) fluorosulfonic acid, chlorosulfonic acid, or mixtures thereof, and (3) a boron trihalide, a tetrahalide of a Group IV element, a pentahalide of a Group V element, or mixtures thereof. The graphite may be in any one of a variety of physical configurations, e.g. as particulate crystals or present in a carbonaceous fibrous material, at the time of the intercalation reaction. The resulting graphite intercalation compound possesses advantageous electrical conductivity characteristics not possessed by plain graphite and is capable of utilization as a light weight electrical conductor. The graphite intercalation compound may optionally be provided within a metal matrix (e.g. within elemental copper) to form an electrically conductive composite article.

30 Claims, No Drawings

PROCESS FOR CONDUCTING ELECTRICITY UTILIZING A SPECIFICALLY DEFINED GRAPHITE INTERCALATION COMPOUND

BACKGROUND OF THE INVENTION

It has long been known that the unique crystalline structure of graphite makes it anisotropic with respect to conducting electrons. Its structure basically comprises planes of aromatically bound carbon atoms. Hence, each of such planes has $\pi$ clouds of electrons above and below it. These electron clouds have been said to contribute to its anisotropic conductive behavior, the conductivity being in a direction parallel to the aromatic carbon planes. This conductivity is approximately 5 percent that of copper.

It also has been known that certain elements or molecules, when diffused into the graphite lattice, assume positions interstitial to the aromatic planes and improve graphite conductivity. Ubbeholde, for example, found that the interstitial compound formed between graphite and nitric acid has a conductivity almost equal to that of copper (which is $0.6 \times 10^6$ ohms$^{-1}$ cm$^{-1}$) when measured parallel to the aromatic planes (A. R. Ubbeholde, Proc. Roy. Soc., A304, 25, 1968).

U.S. Pat. No. 3,409,563 granted to Olstowski describes conductive graphite structures formulated from vermicular graphite and an agent such as $Br_2$, $FeCl_3$, $CrO_2Cl_2$, $SO_3$ $SbCl_5$, $CrCl_3$, $ICl$, $CrO_3$, $AuCl_3$, $InCl_3$, $PtCl_4$, $CrO_2F_2$, $TaCl_5$, $SmCl_3$, $ZrCl_4$, $UCl_4$, and $YCl_3$. The treated vermicular graphite is then compressed into structures.

In my copending U.S. Ser. No. 499,834, filed Aug. 23, 1974, is disclosed the formation of an electrically conductive graphite intercalation compound employing a strong acid halide system wherein graphite is reacted with "the proton donor (Bronsted acid), hydrogen fluoride, and an electron acceptor (Lewis acid) such as boron trihalide, a tetrahalide from a Group IV metal, or a pentahalide from a Group V metal." My German Pat. No. 2,537,272 which was published on Mar. 4, 1976 is a counterpart of the above-mentioned U.S. Ser. No. 499,834.

As discussed in detail hereafter the presently claimed invention contemplates the utilization of fluorosulfonic acid, i.e. $HSO_3F$, (sometimes designated "fluorosulfuric acid") or the closely related chlorosulfonic acid in combination with antimony pentafluoride or similar halide to form a graphite intercalation compound. The nature of this system, inter alia, is discussed in "Friedel-Crafts and Related Reactions" edited by George A. Olah, Interscience Publishers (1963). See particularly Chapter III by R. J. Gillespie at Page 191 where it is stated with respect to a fluorosulfuric acid/antimony pentafluoride system: "No simple proton acids are known in this system but $SbF_5$ has been found to exhibit acid behavior by ionizing according to the equation $$SbF_5 + 2HSO_3F = H_2SO_3F^+ + SbF_5(SO_3F)^-.$$
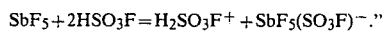

Various acid systems are also discussed in "The Chemistry of Superacid Systems" by R. J. Gillespie appearing in *Endeavour*, Vol. XXXII (115), January 1973. Neither of the above R. J. Gillespie writings is directed to the formation of graphite intercalation compounds by any technique.

It is an object of the present invention to provide a novel graphite intercalation compound of relatively high electrical conductivity.

It is an object of the present invention to provide a novel process for the formation of a highly electrically conductive graphite intercalation compound.

It is a further object of the present invention to provide a novel process for preparing a highly electrically conductive graphite intercalation compound which readily can be formed in a carbonaceous fibrous material comprising graphitic carbon.

These and other objects, as well as the scope, nature, and utilization of the present invention will be apparent to those skilled in the art from the following detailed description and appended claims.

SUMMARY OF THE INVENTION

It has been found that an electrically conductive composition can be formed which comprises a graphite intercalation compound formed under anhydrous conditions of:
(a) graphite,
(b) a sulfur-containing reactant selected from the group consisting of fluorosulfonic acid, chlorosulfonic acid, and mixtures thereof, and
(c) a halide reactant selected from the group consisting of a boron trihalide, a tetrahalide of a Group IV element, a pentahalide of a Group V element, and mixtures thereof,
wherein the molar ratio of the sulfur-containing reactant to the halide reactant is within the range of approximately 0.01:1 to 200:1.

It has been found that a process for forming an electrically conductive composition comprises reacting graphite under anhydrous conditions with (a) a sulfur-containing reactant selected from the group consisting of fluorosulfonic acid, chlorosulfonic acid, and mixtures thereof, and with (b) a halide reactant selected from the group consisting of a boron trihalide, a tetrahalide of a Group IV element, a pentahalide of a Group V element, and mixtures thereof; wherein the molar ratio of the sulfur-containing reactant to the halide reactant is within the range of approximately 0.01:1 to 200:1, thereby forming a graphite intercalation compound.

DESCRIPTION OF PREFERRED EMBODIMENTS

The graphite which is intercalated in accordance with the present invention may be provided in a variety of physical configurations at the time of intercalation. For instance, the graphite may be initially provided in the form of large crystals, crystalline powder, bulk or sintered graphite, carbonaceous fibrous materials (i.e. carbon filaments) which include graphitic carbon, etc. It is a general rule that the more perfect the graphite starting material is, the better the conductivity of the resultant graphite intercalation compound. Hence, it is preferable to employ graphite of relatively high purity and which has a high degree of crystallinity. However, graphite of lower degrees of purity and crystallinity can be selected. The structure of high modulus carbon filaments is such that the normal to the "c" axis of the graphite crystals present therein lies parallel to the filament axis and there is an axis of rotational symmetry about this normal. The graphite starting material can be conveniently formed by known techniques prior to the intercalation reaction described hereafter.

The second essential reactant required to form the graphite intercalation compound of the present invention is fluorosulfonic acid, chlorosulfonic acid, or mixtures of the same. This reactant must be anhydrous. Fluorosulfonic acid possesses the formula $HSO_3F$ and is a colorless fuming liquid having a boiling point of approximately 165° C. This fluorosulfonic acid reactant sometimes is designated "fluorosulfuric acid" or "fluosulfonic acid" in the literature. Chlorosulfonic acid possesses the formula $HSO_3Cl$ and is a colorless to light yellow liquid having a boiling point of approximately 158° C. The chlorosulfonic acid reactant sometimes is designated sulfuric chlorohydrin. The customary care should be taken in the handling of these highly toxic materials.

The third essential reactant required to form the graphite intercalation compound of the present invention is a Lewis acid electron pair acceptor which is a halide selected from the group consisting of a boron trihalide, a tetrahalide of a Group IV element (e.g. of a Group IV metal), a pentahalide of a Group V element (e.g. of a Group V metal), and mixtures thereof. This reactant must be anhydrous. The preferred halides for use in the present process are the fluorides. The Group IV elements may be under either of headings IVA or IVB of the periodic table published at Page 662 of "The Condensed Chemical Dictionary," Ninth Edition, Van Nostrand Reinhold (1977). Preferred Group IV element tetrahalides are $SIF_4$ (i.e. silicon tetrafluoride), $HfF_4$ (i.e. hafnium tetrafluoride), $TiF_4$ (i.e titanium tetrafluoride), and $ZrF_4$ (i.e. zirconium tetraflouride). The Group V elements may be under either of headings VA or VB of the periodic table published at Page 662 of "The Condensed Chemical Dictionary," Ninth Edition, Van Nostrand Reinhold (1977). Preferred Group V element pentafluorides are $PF_5$ (i.e. phosphorus pentafluoride), $NbF_5$ (i.e. niobium pentafluoride), $TaF_5$ (i.e. tantalum pentafluoride), $AsF_5$ (i.e. arsenic pentafluoride), and $SbF_5$ (i.e. antimony pentafluoride). The particularly preferred halide reactants for use in the present invention are $SbF_5$ and $AsF_5$. The usual care should be taken in the handling of the toxic halide reactant.

As will be apparent to those skilled in the art the desired intercalation compound formation must be carried out in vessels which are capable of withstanding the reactants. Suitable materials for the reaction vessels include Type 304 stainless steel, Type 316 stainless steel, high nickel alloys (e.g. Monel alloy available from the Huntington Alloy Products Division of the International Nickel Co., Inc.), polytetrafluoroethylene (e.g. Teflon polymer available from E. I. DuPont de Nemours Co.), other fluorocarbon polymers (e.g. Kel-F polymer available from 3M Company), etc.

It is essential that anhydrous conditions be maintained during the formation of the graphite intercalation compound. The atmosphere in which the intercalation reaction is carried out also should be inert. The desired graphite intercalation compound is formed by simultaneously exposing the solid graphite to the above-identified reactants under such anhydrous conditions. Alternatively, the desired graphite intercalation compound can be formed by reacting the graphite sequentially with the sulfur-containing reactant followed by the halide reactant. The reactants may be in the liquid and/or gaseous form when contacted with the solid graphite. Atmospheric or superatmospheric pressure conditions may be utilized during the formation of the graphite intercalation compound. Each of the two classes of reactants are easily used in substantially equimolar quantities since such admixture is commercially available; however, the molar ratio of the sulfur-containing reactant to the halide reactant may be within the range of approximately 0.01:1 to 200:1 (e.g. 0.01:1 to 100:1). In a preferred embodiment the molar ratio of sulfur-containing reactant to the halide reactant is approximately 1:1. Reaction temperatures of approximately 10° to 200° C. commonly are employed, and reaction times for fibers and powders commonly range from approximately 1 to 30 minutes, and reaction times for large crystals commonly range from approximately 0.1 to several hundred hours.

In the laboratory it has been found especially practical to combine the intercalating reactants with the graphite under inert conditions in a closed system. Typically, it is preferred to employ an apparatus such as a "dry box." This apparatus permits the materials to be placed separately, in sealed containers, into a closed chamber which is flushed with an inert gas such as dried argon or nitrogen. Access to the chamber is had through gas-tight gloves. Hence, the sealed containers are opened under an inert atmosphere and the desired intercalation reaction can be performed without fear of contamination.

In another embodiment of the present invention, the resulting graphite intercalation compound while in filament form is incorporated into a metal matrix to form an electrically conductive composite article, thereby imparting to the filaments enhanced physical properties such as flexibility, strength against breakage, solderability, etc., and properties which are more akin to those of metal conductors. Thus a metal composite of the intercalated graphite filaments of the present invention has wider possibilities for practical application than the filaments themselves.

Such metal/intercalated graphite composites of the present invention can be prepared from any of a number of desired metals, and the particular metal employed is restricted solely by the intended application of the composite. Copper is deemed preferable for most applications, but excellent results are obtained from silver, aluminum, and nickel. It is also advantageous from a structural standpoint to utilize metals which form a hexagonal lattice structure, such as zinc and cadmium. Such metals are particularly compatible with graphite (which is also hexagonal) in that advantageous reorientation can be achieved during the deformation stage in preparing the metal composite.

Several methods can be employed in preparing metal composites of the present graphite compounds. For instance, if the graphite intercalation compound is present in filament form a metal plating technique can be employed. Hence, intercalated graphite filaments can be made the cathode in a metal plating solution. This process can be batchwise, in which case an electrode is attached to one end of a yarn which is submerged in the plating solution. Alternatively, the composite can be made continuously be passing the filaments while in continuous form over a metal electrode and into the plating bath. Residence times and other reaction conditions are easily determinable by one of reasonable skill in the art, and such reaction parameters are functions of the particular plating bath, cathode current, graphite yarn conductivity, cross-sectional area, etc. Another method of forming metal composites of the intercalated graphite filaments comprises twisting metal strands or wires with the filaments. Hence, it is possible to greatly vary physical and electrical properties of conductors by varying the ratio of metal to graphite strands and by choosing strands of a particularly suitable metal. In such composite articles the graphite intercalation compound is electrically oriented along the axis of the resulting composite article, i.e. the resulting electrical conductor.

Powdered particulate intercalated graphite of the present invention also can be formed into a composite article. For instance, the powdered intercalated graphite can be thoroughly mixed with a powder of the desired metal and then compressed at pressures in the range of approximately 10 to 100,000 psig. The exact pressure selected is influenced by the specific metal employed. When using copper, it has been found that a pressure of about 60,000 psig. is ideal for copper particles having an average size of approximately 60μ. This compression step can then be followed by annealing at temperatures of about 250 to 1000° C. in a hydrogen atmosphere. The ratio of metal to graphite in this composite forming technique is not critical, but the resultant composite preferably contains as much intercalated graphite as possible. However, when the metal phase becomes discontinuous, the strength of the matrix is seriously impaired. To ensure continuity of the metal phase, it has been found desirable to employ about 30 percent intercalated graphite by volume. This amount permits the use of a wide range of particle sizes. It should be noted that best results are obtained when fine metal particles are employed, and when an excess of 30 percent intercalated graphite by volume is used the metal particles must be finer than if the intercalated graphite is restricted to 30 percent by volume. Well known powder metallurgy techniques may be utilized when forming the resulting composite article which can be formed into a suitable conductor which is electrically oriented along the axis of the conductor.

Additionally, powdered particulate intercalated graphite of the present invention can be formed into a composite article employing a sheath method. In this method, a tube of the appropriate metal, such as ¼ inch outer diameter copper tubing, is filled with the intercalated graphite powder and the powder is lightly tamped therein. Excessive packing of the powder hampers electrical orientation of the graphite and is to be avoided. When full, the tube is preferably sealed and subjected to swaging. Typically, a ¼ inch outer diameter copper tube, filled with graphite powder, is swaged down to a diameter of about 40 mils by means of a Torrington Swaging Mill. The resultant metal composite conductor accordingly comprises a 40 mil wire having excellent physical and electrical properties with the intercalation compound being electrically oriented along the axis of the conductor.

The present invention provides a route for the formation of highly desirable electrical conductors which employ a novel graphite intercalation compound (as described). Such electrical conductors are lighter in weight than conventional metallic electrical conductors and can be utilized, for instance, to advantage in those applications where reduced weight is of importance. The electrical conductors of the present invention commonly have a configuration of an elongated wire. Other physical configurations are possible however. For instance, conductor strips can be formed for use as bus bars in electrical equipment. Additionally, electrically conductive composite articles can be formed wherein fibers containing the graphite intercalation compound are incorporated in a matrix material (e.g. an epoxy resin). Such light weight composite articles are particularly suited for use in aircraft applications.

The following examples are given as specific illustrations of the formation of preferred graphite intercalation compounds of the present invention. It should be understood, however, that the invention is not limited to the specific details set forth in the examples.

EXAMPLE I

A carbonaceous fibrous material comprising graphitic carbon, which was commercially available from the Celanese Corporation under the designation of GY-70 carbon fiber, was selected for intercalation. Filaments thereof possessed a "dogbone" configuration and were obtained from a multifilament bundle. The fibrous starting material also possessed a Young's modulus of approximately 85,000,000 psi, a tenacity of approximately 300,000 psi, and a density of 2.01 gm./cc.

The electrical resistivities of two filaments of the starting material were determined using a standard four point resistance measuring technique designed to eliminate contact resistance. More specifically, prior to such resistivity measurements the filaments were placed upon substrates comprising alumina ceramic plates possessing four platinum strips, and were attached thereto by baking with a conductive gold paste. A one centimeter spacing existed between the two inner voltage contacts.

The filaments next were placed into a reaction chamber formed of Type 316 stainless steel provided with a nitrogen atmosphere and under anhydrous conditions. While residing in the reaction chamber at room temperature (i.e. about 25° C.) and at atmospheric pressure, the filaments next were immersed in an equimolar admixture of fluorosulfonic acid and antimony pentafluoride while undergoing continuous monitoring for resistance. While immersed in the admixture of fluorosulfonic acid and antimony pentafluoride, a graphite intercalation compound was formed with these reactants. This increases the conductivity in the crystallographic "a" direction which is electrically oriented along the filament axis. When tested by the same four point resistance measuring technique, after 2 to 3 minutes following immersion in the reactants, the resistivity of the intercalated filament was found and recorded. The resistivity is determined from the following formula:

$$\rho = \frac{R \times A}{l}$$

where
$\rho$ = resistivity in $\Omega$ cm
$R$ = resistance in ohms
$A$ = cross-sectional area in cm.
$l$ = length in cm.

The resistance is measured as already described. The cross-sectional area of the filaments was determined from the measured denier per filament and density. The length is the distance between the inner strip on the alumina ceramic plate. Summarized below are the resistivities of the two filaments before and after such intercalation.

| Filament Identity | Denier Per Filament | Resistivity Before Intercalation | Resistivity After Intercalation | Ratio of Before to After Resistivity |
|---|---|---|---|---|
| a | 0.72 | 600 micro-ohm cm. | 21.8 micro-ohm cm. | 28 |

| Filament Identity | Denier Per Filament | Resistivity Before Intercalation | Resisitivity After Intercalation | Ratio of Before to After Resistivity |
|---|---|---|---|---|
| b | 0.72 | 974 micro-ohm cm. | 28.3 micro-ohm cm. | 34 |

EXAMPLE II

A highly oriented pyrolytic graphite crystal, which was cut and cleaved to a configuration of 5 mm.×5 mm.×0.36 mm, was selected for intercalation. The "c" axis was oriented normal to the 5 mm.×5 mm. crystal face. The resistivity of the crystal prior to intercalation was 44.2 micro-ohm cm as determined by a contactless r.f. induction measuring technique. This technique employs a ferrite core with a short gap. A coil wrapped around the core is driven by an oscillator at 1 kHz. Another coil wrapped around the core senses the resonant frequency. The resistance of the sample is determined from the shift in frequency when the sample is inserted in the gap. From this resistance and the known sample geometry, the resistivity can be calculated.

The crystal while present in a glove box provided with a nitrogen atmosphere is inserted into a Kel-F fluorocarbon polymer tube having an inside cavity measuring 2 mm.×6 mm. An equimolar admixture of fluorosulfonic acid and antimony pentafluoride is next poured into the cavity containing the crystal. The tube is sealed with a tightly fitting Kel-F fluorocarbon polymer cap, and is held at room temperature (i.e. about 25° C.) and at atmospheric pressure. After approximately 10 minutes the intercalated crystal was tested for resistivity, and it was found to be 4.86 micro-ohm cm. Also the "c" axis dimension of the intercalated crystal was expanded and the new thickness found to be 0.54 mm.

EXAMPLE III

Natural flake graphite was selected as the starting material. Two hundred and fifty-two parts by weight were placed into a Type 316 stainless steel bomb which was provided in a nitrogen atmosphere under anhydrous conditions. To this bomb also was added 317 parts by weight of a equimolar admixture of fluorosulfonic acid and antimony pentafluoride while maintaining the nitrogen atmosphere and the anhydrous conditions. The bomb next was sealed and heated to 150° C. for 20 hours.

The resulting intercalated graphite powder was next inserted into a hollow graphite tube having an outer diameter of 6.4 mm., and the ends of the tube were sealed. The tube was swaged into a wire having an outer diameter of 1.8 mm. This composite wire was found to have a resistivity of 1.66 micro-ohm cm. as determined by a standard four point resistance measuring technique designed to eliminate errors due to contact resistance. The measurement in this instance employs a jig with four contact clamps in a line. The outer contacts are 15 cm. apart and the inner contacts are 10 cm. apart. When connected to a Shallcross Milli-ohmmeter a current of one ampere flows through the outer contacts and the voltage drop is measured across the inner contact. The meter is arranged to read milli-ohms directly.

For comparative purposes the Example III was repeated with the exception that the natural graphite flake was subjected to no form of intercalation. In this instance the resulting composite wire was found to have a resistivity of 2.04 micro-ohm cm.

Although the invention has been described with a preferred embodiments, it is to be understood that variations and modifications may be employed without departing from the concept of the invention as defined in the following claims.

I claim:

1. A process for conducting electricity comprising providing an electrically conductive composition which comprises a graphite intercalation compound formed under anhydrous conditions of:
   (a) graphite,
   (b) a sulfur-containing reactant selected from the group consisting of fluorosulfonic acid, chlorosulfonic acid, and mixtures thereof, and
   (c) a halide reactant selected from the group consisting of a boron trihalide, a tetrahalide of a Group IV element, a pentahalide of a Group V element, and mixtures thereof, wherein the molar ratio of said sulfur-containing reactant to said halide reactant is within the range of approximately 0.01:1 to 200:1, and connecting an electrical source to said electrically conductive composition.

2. A process for conducting electricity according to claim 1 wherein said graphite intercalation compound is present in a filament which is electrically oriented along its axis.

3. A process for conducting electricity according to claim 1 wherein said graphite intercalation compound is present in a metal composite.

4. A process for conducting electricity according to claim 3 in which said metal comprises elemental copper.

5. A process for conducting electricity according to claim 1 wherein said halide reactant is a fluoride.

6. A process for conducting electricity according to claim 1 wherein said Group IV element tetrahalide is $SiF_4$, $HfF_4$, $TiF_4$, or $ZrF_4$, and said Group V element pentahalide is $PF_5$, $NbF_5$, $TaF_5$, $AsF_5$ or $SbF_5$.

7. A process for conducting electricity according to claim 1 wherein said halide reactant is $SbF_5$.

8. A process for conducting electricity according to claim 1 wherein said halide reactant is $AsF_5$.

9. A process for conducting electricity comprising providing an electrically conductive composition which comprises a graphite intercalation compound in the configuration of a filament which is electrically oriented along its axis formed under anhydrous conditions of:
   (a) a carbonaceous filament comprising graphitic carbon,
   (b) a sulfur-containing reactant selected from the group consisting of fluorosulfonic acid, chlorosulfonic acid, and mixtures thereof, and
   (c) a halide reactant selected from the group consisting of $SbF_5$ and $AsF_5$, and mixtures thereof, wherein the molar ratio of said sulfur-containing reactant to said halide reactant is within the range of approximately 0.01:1 to 200:1, and connecting an electrical source to said electrically conductive composition.

10. A process for conducting electricity according to claim 9 wherein said sulfur-containing reactant is fluorosulfonic acid.

11. A process for conducting electricity according to claim 9 wherein said sulfur-containing reactant is fluorosulfonic acid, and said halide reactant is $SbF_5$.

12. A process for conducting electricity according to claim 9 wherein said sulfur-containing reactant is fluorosulfonic acid, and said halide reactant is $AsF_5$.

13. A process for conducting electricity according to claim 9 wherein said sulfur-containing reactant is chlorosulfonic acid.

14. A process for conducting electricity comprising:
   (a) reacting graphite crystals with a sulfur-containing reactant selected from the group consisting of fluorosulfonic acid, chlorosulfonic acid, and mixtures thereof, and with a halide reactant selected from the group consisting of a boron trihalide, a tetrahalide of a Group IV element, a pentahalide of a Group V element, and mixtures thereof, wherein the molar ratio of said sulfur-containing reactant to said halide reactant is within the range of approximately 0.01:1 to 200:1, to obtain an electrically conductive graphite intercalation compound,
   (b) preparing a composite of said graphite intercalation compound with a metal,
   (c) forming a conductor from said composite such that said graphite intercalation compound is electrically oriented along the axis of said conductor, and
   (d) connecting an electrical source to said conductor.

15. A process for conducting electricity according to claim 14 wherein said halide reactant is a fluoride.

16. A process for conducting electricity according to claim 14 wherein said Group IV element tetrahalide is $SiF_4$, $HfF_4$, $TiF_4$, or $ZrF_4$, and said Group V element pentahalide is $PF_5$, $NbF_5$, $TaF_5$, $AsF_5$ or $SbF_5$.

17. A process for conducting electricity according to claim 14 wherein said halide reactant is $SbF_5$.

18. A process for conducting electricity according to claim 14 wherein said halide reactant is $AsF_5$.

19. A process for conducting electricity according to claim 1 wherein said sulfur-containing reactant is fluorosulfonic acid.

20. A process for conducting electricity according to claim 1 wherein said sulfur-containing reactant is chlorosulfonic acid.

21. A process for conducting electricity according to claim 1 wherein the molar ratio of said sulfur-containing reactant to said halide reactant is within the range of approximately 0.01:1 to 100:1.

22. A process for conducting electricity according to claim 1 wherein the molar ratio of said sulfur-containing reactant to said halide reactant is approximately 11:1.

23. A process for conducting electricity according to claim 9 wherein said sulfur-containing reactant is fluorosulfonic acid.

24. A process for conducting electricity according to claim 9 wherein said sulfur-containing reactant is chlorosulfonic acid.

25. A process for conducting electricity according to claim 9 wherein the molar ratio of said sulfur-containing reactant to said halide reactant is within the range of approximately 0.01:1 to 100:1.

26. A process for conducting electricity according to claim 9 wherein the molar ratio of said sulfur-containing reactant to said halide reactant is approximately 11:1.

27. A process for conducting electricity according to claim 14 wherein said sulfur-containing reactant is fluorosulfonic acid.

28. A process for conducting electricity according to claim 14 wherein said sulfur-containing reactant is chlorosulfonic acid.

29. A process for conducting electricity according to claim 14 wherein the molar ratio of said sulfur-containing reactant to said halide reactant is within the range of approximately 0.01:1 to 100:1.

30. A process for conducting electricity according to claim 14 wherein the molar ratio of said sulfur-containing reactant to said halide reactant is approximately 11:1.

* * * * *